(12) United States Patent
Yamada et al.

(10) Patent No.: US 6,816,153 B2
(45) Date of Patent: Nov. 9, 2004

(54) TOUCH-PANEL DEVICE

(75) Inventors: Tsutomu Yamada, Moriyama (JP); Toshiyuki Kobayashi, Kameoka (JP)

(73) Assignee: Gunze Limited, Kyoto (JP)

( * ) Notice: Subject to any disclaimer, the term of this patent is extended or adjusted under 35 U.S.C. 154(b) by 53 days.

(21) Appl. No.: 09/920,991

(22) Filed: Aug. 3, 2001

(65) Prior Publication Data

US 2002/0039094 A1 Apr. 4, 2002

(30) Foreign Application Priority Data

Aug. 4, 2000 (JP) ........................................ 2000-236413
Sep. 26, 2000 (JP) ........................................ 2000-291874

(51) Int. Cl.[7] ........................... G09G 5/00; G06K 11/06; G06K 11/16
(52) U.S. Cl. .................. 345/174; 178/18.02; 178/18.05
(58) Field of Search ................................. 345/173, 174; 178/18.01, 18.03, 18.5

(56) References Cited

U.S. PATENT DOCUMENTS

| | | | | |
|---|---|---|---|---|
| 4,853,498 A | * | 8/1989 | Meadows et al. | 345/174 |
| 5,113,041 A | * | 5/1992 | Blonder et al. | 345/173 |
| 5,402,151 A | * | 3/1995 | Duwaer | 345/173 |
| 5,510,813 A | * | 4/1996 | Makinwa et al. | 345/173 |
| 5,642,134 A | * | 6/1997 | Ikeda | 345/174 |
| 5,854,451 A | * | 12/1998 | Miyazaki et al. | 178/18.05 |
| 6,163,313 A | * | 12/2000 | Aroyan et al. | 345/173 |
| 6,297,811 B1 | * | 10/2001 | Kent et al. | 345/173 |
| 6,344,847 B1 | * | 2/2002 | Nagao | 345/173 |

* cited by examiner

*Primary Examiner*—Richard Hjerpe
*Assistant Examiner*—M. Fatahiyar
(74) *Attorney, Agent, or Firm*—Smith, Gambrell & Russell, LLP

(57) ABSTRACT

A touch-panel device including a conductive membrane, current measurement resistors which are connected at one end to both ends of the conductive membrane and which are connected at the other end to one another, an oscillator which is connected on one end to the connection point of the current measurement resistors and is connected on its other end to the ground, and a serial connection circuit of a switch and a load impedance which circuit is connected between the ground side of the oscillator and one end of the conductive membrane. The touch-panel device measures voltages $V_{10}$ and $V_{20}$ of both resistors and calculates $R_k/R_o = V_{20}/(V_{10}-V_{20})$ by turning the switch ON. When a touch position is to be measured, substitute $R_k/R_o$ to the equation of $R_L/R_o = R_k(V_2-V_1)/R(V1+V2)+V2/(V1+V2)$ so as to obtain a touch position. Therefore, touch position detection accuracy is improved and the cost is reduced.

3 Claims, 15 Drawing Sheets

(a)

(b) Connection when measurement is made in X-axis direction (c) Connection when measurement is made in Y-axis direction Extent of the value of $R_L/R_O$ when calculation is
carried out using $V_1$ and $\overline{V}_2$ (  )

Fig. 10

| X Y | $X_0$ | $X_1$ | $X_2$ | ...... | $X_n$ |
|---|---|---|---|---|---|
| $Y_0$ | (0, 0) | ($x_{10}, y_{10}$) | ($x_{20}, y_{20}$) | ...... | (1, 0) |
| $Y_1$ | ($x_{01}, y_{01}$) | ($x_{11}, y_{11}$) | ($x_{21}, y_{21}$) | ...... | ...... |
| $Y_2$ | ($x_{02}, y_{02}$) | ($x_{12}, y_{12}$) | ($x_{22}, y_{22}$) | ...... | ...... |
| ...... | ...... | ...... | ...... | ...... | ...... |
| $Y_n$ | (0, 1) | ...... | ...... | ...... | (1, 1) |

| Panel species | Resistance of conductive membrane $\rho\,[\Omega/\square]$ | Resistance of electrode $R_A\,[\Omega]$ | Maximum value of curvature $C_A\,[mm]$ |
|---|---|---|---|
| Panel A | 500 | 2,000 | 124.5 |
| Panel B | 600 | 200 | 10.4 |
| Panel C | 1,000 | 336 | 10.5 |
| Panel D | 2,000 | 544 | 8.5 |
| Panel E | 2,000 | 800 | 12.5 |
| Panel F | 2,000 | 960 | 14.9 |
| Panel G | 2,000 | 1,200 | 18.7 |

TOUCH-PANEL DEVICE

TECHNICAL FIELD

The present invention relates to a touch-panel device for detecting a touched position of a finger of an operator, conductive pen or the like to a surface of a touch-panel which has an arrangement that a conductive membrane is provided on a surface of a substrate. More particularly, the present invention relates to a touch-panel device which is used for a tablet for selecting and for touching by a user for responding questions, or which is used for selecting information item (menu) by a user which is displayed on a surface of a display {CRT(Cathode Ray Tube), liquid crystal panel or the like } connected to a computer information processing system, especially.

RELATED ART

Such touch-panel device is proposed in Patent Application Publication No. Shou 56-500230 gazette entitled "Touch-panel system and method", Japanese Patent Laid-Open Publication No. Shou 63-108423 gazette entitled "Finger touching type coordinates outputting apparatus", Japanese Patent Publication No. hei 6-12508 gazette entitled "contact type position detection apparatus" and the like.

FIG. 11 is a schematic diagram useful in understanding touching position detection principal of those devices.

To both ends of a conductive membrane 1 on a touch-panel, one end of current measurement resistors 2, 3 are connected, respectively. The other end of the current measurement resistors 2, 3 have a common connection point. The common connection point is connected to an AC power source 4 one end of which is connected to the ground. The conductive membrane 1 is touched at its arbitrary point using a finger, or an impedance Z such as a conductive pen or the like one side of which is connected to the ground.

Under this condition, it is supposed that the resistance value of the conductive membrane 1 between one end and the finger is $R_L$, that the resistance value of the conductive membrane 1 between the other end and the finger is $R_H$, and that the entire resistance of the conductive membrane 1 is $R_0$. Further, the resistance of the current measurement resistors 2, 3 are determined to be the resistance value $R_K$, and the voltages of the both ends of the current measurement resistors 2, 3 are determined to be $V_1$ and $V_2$, respectively.

When such assumptions are made, the following equation is satisfied.

$$\frac{R_L}{R_0} = \frac{R_K(V_2 - V_1)}{R_0(V_1 + V_2)} + \frac{V_2}{V_1 + V_2} \quad (1)$$

From this equation (1), a touching point of a finger can be detected based only upon the measurement values of voltages $V_1$ and $V_2$.

Japanese Patent Publication No. Hei 6-12508 entitled "Contact type position detection apparatus" discloses an arrangement that electrodes are provided at outer peripheral sections of the conductive membrane of position detection region, the electrodes having smaller resistance value with respect to the conductive membrane.

The "Touch-panel system and method" and the "Finger touching type coordinates output apparatus" have following disadvantages.

a. In the equation (1), the resistance value of the resistance of the conductive membrane should be substituted. But, when a constant value is input, detection accuracy is lowered depending upon the change following passage in time of the conductive membrane and the installment environment of the conductive membrane. Further, when the resistance value is measured at every position detection and when the resistance value is substituted, measurement circuitry becomes complicated and expensive. Furthermore, changing in resistance value of the conductive membranes is great therefore yield of mass produced conductive membranes is lowered. As a result, a touch-panel is increased in cost.

b. Electrodes made of low resistance conductive material have resistance value which are provided outer peripheral section of the conductive membrane. Therefore, the value which is $R_L/R_0$ at both ends in X-axis or Y-axis becomes 0 or 1 at corner sections and becomes a value different from 0 or 1 at sections which are not the corner sections, as is illustrated in FIG. 9. As a result, detection accuracy is greatly lowered when the equation (1) is employed.

The "Contact type position detection apparatus" has following disadvantage.

Improvement in values for sections apart from both edges in X-axis or Y-axis is insufficient, the values being different from 0 or 1, as is illustrated in FIG. X2.

The present invention was made in view of the above problems.

It is an object of the present invention to offer a touch-panel device which has high position detection accuracy, and which can be manufactured with a low cost.

It is another object of the present invention to offer a touch-panel device which has high position detection accuracy, and which has short operating and processing time, and which can be manufactured with a low cost.

SUMMARY OF THE INVENTION

A touch-panel device of claim 1 according to the present invention is a touch-panel device which comprises a touch-panel including a substrate and a conductive membrane provided on the substrate, an AC current generation section for supplying AC currents to the conductive membrane through a first point and a second point which are at outer peripheral sections of the conductive membrane, and current measurement sections for measuring a first current supplied through the first point and a second current supplied through the second point, and wherein a touched position is calculated based upon the measured first current and the measured second current, and The touch-panel device is characterized in that the device comprises an impedance which is connected by interposing a switch between one end of the AC current generation section and a connection point of the first point and one end of the current measurement section, at least, and wherein A touch position on the touch-panel is calculated based upon a current measurement value measured by the current measurement means when the switch is turned ON and another current measurement value measured by the current measurement means when the switch is turned OFF.

When this touch-panel device is employed, a touch position on the touch-panel is calculated based upon a current measurement value measured by the current measurement means when the switch is turned ON and another current measurement value measured by the current measurement means when the switch is turned OFF. Therefore, variation in resistance value of the conductive membrane or changing in resistance value of the conductive membrane following passage of time are not needed to be taken into consideration which is described later, so that touch-position detection with high accuracy is realized.

A touch-panel device of claim 2 according to the present invention is characterized in that the switch is turned ON and turned OFF at every constant interval, a current measurement value measured by the current measurement means when the switch is turned ON is memorized, and a touch position on the touch-panel is calculated based upon the memorized current measurement value and a current measurement value measured by the current measurement means when the switch is turned OFF.

When this touch-panel device is employed, changing in resistance of the conductive membrane following passage of time is applied correction calculation and is renewed and memorized at every constant interval, therefore touch-position detection with high accuracy is realized. Further, it is not necessary that the switch is turned ON and turned OFF and self-correction calculation is applied at every touch position detection, therefore a measurement time is shortened.

A touch-panel device of claim 3 according to the present invention is a touch-panel device which comprises a touch-panel including a substrate and a conductive membrane provided on the substrate, an AC current generation section for supplying AC currents to the conductive membrane through a first point and a second point which are at outer peripheral sections of the conductive membrane, and current measurement sections for measuring a first current supplied through the first point and a second current supplied through the second point, and wherein a touched position is calculated based upon the measured first current and the measured second current, and The touch-panel device is characterized in that a chart is provided which includes corrected touch position information each corresponding to a calculation value of the touch position, and wherein The corrected touch position corresponding to the calculation value of the touch position is obtained from the chart.

When this touch-panel device is employed, the chart is provided which includes corrected touch positions each corresponding to each calculation value of touch position in at least one direction, and shifting in touch position due to resistance of the conductive membrane is corrected. Therefore, touch position detection with high accuracy is realized.

A touch-panel device of claim 4 according to the present invention is a touch-panel device which comprises a touch-panel including a substrate and a conductive membrane provided on the substrate, an AC current generation section for supplying AC currents to the conductive membrane through a first point and a second point which are at outer peripheral sections of the conductive membrane, and current measurement sections for measuring a first current supplied through the first point and a second current supplied through the second point, and wherein a touched position is calculated based upon the measured first current and the measured second current, and The touch-panel device is characterized in that a correction operation formula for correcting the calculated touch position is memorized, and wherein The calculated touch position is applied to the correction operation formula so as to perform the correction operation of the touch position on the touch-panel.

When this touch-panel device is employed, shifting in touch position due to the resistance of the conductive membrane is corrected, so that touch position detection with high accuracy is realized.

A touch-panel device of claim 5 according to the present invention is characterized in that electrodes made of low resistance conductive material are provided at outer peripheral sections of the conductive membrane of the touch-panel.

When this touch-panel device is employed, shifting in touch position due to resistance of the conductive membrane is reduced by providing the electrodes made of low resistance conductive material are provided at outer peripheral sections of the conductive membrane of the touch-panel.

A touch-panel device of claim 6 according to the present invention is a touch-panel device which comprises a touch-panel including a substrate and a conductive membrane provided on the substrate and electrodes made of low resistance conductive material lower than the resistance of the conductive membrane which electrodes are provided at peripheral sections of the conductive membrane, an AC current generation section for supplying AC currents to the conductive membrane through a first point and a second point which are at outer peripheral sections of the conductive membrane, and current measurement sections for measuring a first current supplied through the first point and a second current supplied through the second point, and wherein a touched position is calculated based upon the measured first current and the measured second current, and The touch-panel device is characterized in that the resistance value of the electrodes is determined to be an optimum value using calculation formulae of:

$$C_A=(X^*R_A)/(8^*\rho) \text{ and}$$

$$C_B=(Y^*R_B)/(8^*\rho).$$

Wherein, $C_A$ [mm] is a maximum curvature of linearity in periphery of electrode section in X-axis direction, $C_B$ [mm] is a maximum curvature of linearity in periphery of electrode section in Y-axis direction, $R_A$ [Ω] is a sum of resistances between electrodes of 1 electrodes in X-axis direction, $R_B$ [Ω] is a sum of resistances between electrodes of 1 electrodes in Y-axis direction, X [mm] is a length of the electrode in X-axis direction, Y [mm] is a length of the electrode in Y-axis direction, and $\rho$[Ω/□] is a resistance value of the conductive membrane on the surface of the substrate.

When this touch-panel device is employed, the resistances $R_A$, $R_B$ of the electrode patterns are obtained using calculation formulae, then the values of the maximum curvatures $C_A$, $C_B$ are calculated. And, the resistances $R_A$, $R_B$ are obtained by trial and error which make the values of the maximum curvatures $C_A$, $C_B$ to be the minimum values, then the panel electrodes in this condition are determined to have optimum values in resistance value. Shifting in touch position due to resistance of the conductive membrane is reduced by the above determination.

A touch-panel device of claim 7 according to the present invention is a touch-panel device which comprises a touch-panel including a substrate and a conductive membrane provided on the substrate and electrodes made of low resistance conductive material lower than the resistance of the conductive membrane which electrodes are provided at peripheral sections of the conductive membrane, an AC current generation section for supplying AC currents to the conductive membrane through a first point and a second point which are at outer peripheral sections of the conductive membrane, and current measurement sections for measuring a first current supplied through the first point and a second current supplied through the second point, and wherein a touched position is calculated based upon the measured first current and the measured second current, and The touch-panel device is characterized in that the resistance values of the electrodes are sequentially changed from the first point or the second point of the electrodes to the central section of the electrode.

When this touch-panel device is employed, the resistance values of the electrodes are sequentially changed from the first point or the second point of the electrodes to the central section of the electrode by changing the thickness or the width of the electrodes, for example. Therefore, shifting in touch position due to the resistance of the conductive membrane is reduced.

A touch-panel device of claim 8 according to the present invention is characterized in that the resistance values of the electrodes are sequentially changed from the first point or the second point of the electrodes to the central section of the electrode by changing the thickness of the electrodes.

When this touch-panel device is employed, shifting in touch position due to the resistance of the conductive membrane is reduced. Further, the width of the electrodes can be determined to be small so that the touch-panel device is decreased in size and is decreased in cost.

A touch-panel device of claim 9 according to the present invention is characterized in that the resistance values of the electrodes are sequentially changed from the first point or the second point of the electrodes to the central section of the electrode by changing the width of the electrodes.

When this touch-panel device is employed, shifting in touch position due to the resistance of the conductive membrane is reduced.

A touch-panel device of claim 10 according to the present invention is characterized in that the resistance values of the electrodes are sequentially changed from the first point or the second point of the electrodes to the central section of the electrode by constructing the electrodes by connecting a plurality of electrode element.

When this touch-panel device is employed, shifting in touch position due to the resistance of the conductive membrane is reduced.

BRIEF DESCRIPTION OF THE DRAWINGS

FIG. 10 is a correction table of touch position detection coordinates (x, y) of the touch-panel device of the embodiment;

DETAILED DESCRIPTION OF THE PREFERRED EMBODIMENTS

Hereinafter, referring to the attached drawings, we explain the embodiments according to the present invention in detail.

Figure 1:
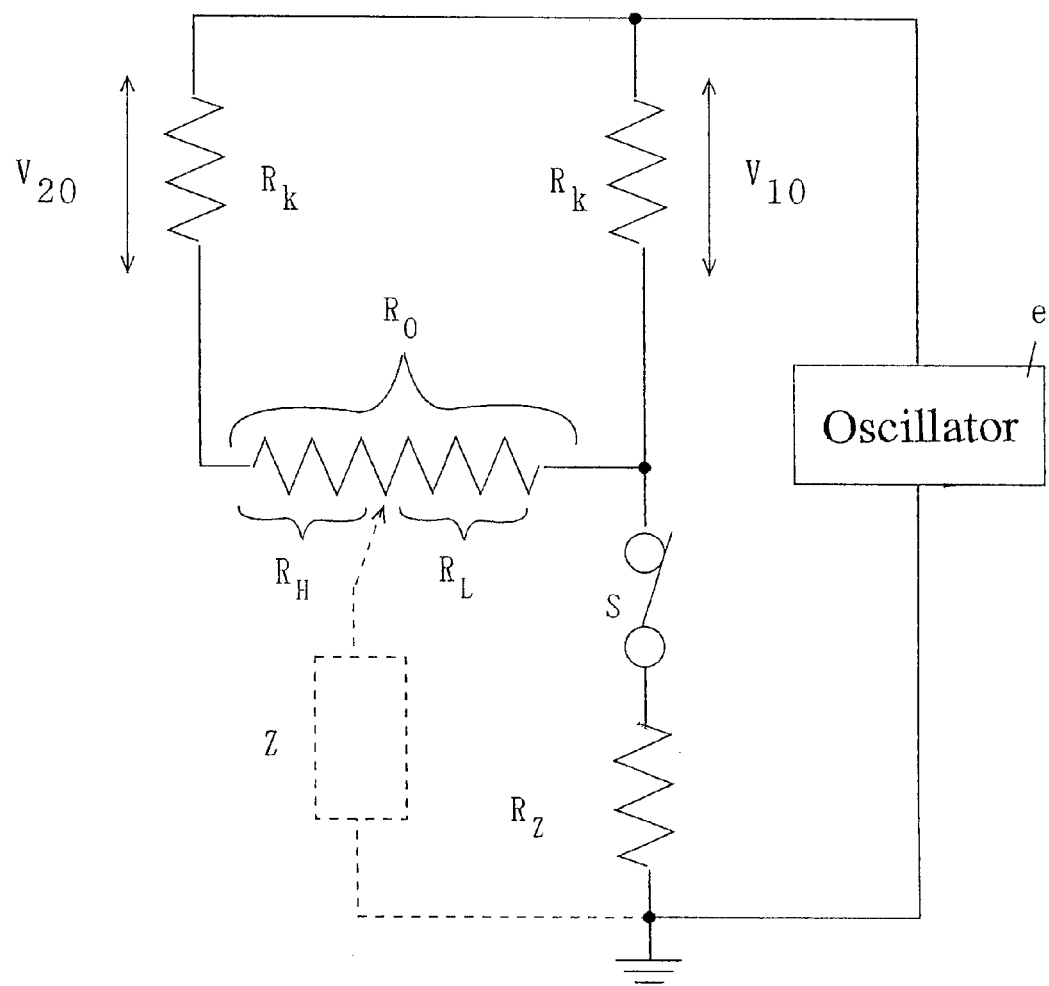
FIG. 1 is an electric diagram useful in understanding a touch-panel device of an embodiment.

FIG. 1 is a schematic diagram useful in understanding a principal of a touch-panel device of an embodiment.

One ends of current measurement resistors $R_K$, $R_K$ are connected to both ends of a conductive membrane (resistance of $R_0$), respectively. The other ends of the current measurement resistors $R_K$, $R_K$ have a common connection point which is connected to one end of an oscillator e. The other end of the oscillator e is connected to the ground. A resistor $R_Z$ is connected to the ground by interposing a switch S from a connection point of one end of the conductive membrane and one current measurement resistors $R_K$ which is connected to the one end of the conductive membrane.

When it is supposed that voltages between both ends of the current measurement resistors $R_K$, $R_K$ are determined to be $V_{10}$, $V_{20}$, when the switch S is turned ON, following equations are satisfied.

$$V_{20}R_0 = R_K(V_{10} - V_{20}) \qquad (2)$$

$$\frac{R_K}{R_0} = \frac{V_{20}}{V_{10} - V_{20}}$$

When the equation (1) is substituted for the equation (2), a following equation is satisfied.

$$\frac{R_L}{R_0} = \frac{V_{20}}{V_{10} - V_{20}} \cdot \frac{V_2 - V_1}{V_1 + V_2} + \frac{V_2}{V_1 + V_2} \qquad (3)$$

From the equation (3), it is understood that a position touched with a finger is detected by measuring $V_{10}$, $V_{20}$, $V_1$ and $V_2$ even when the value of $R_0$ is not known.

Further, changing in resistance value of the conductive membrane following passage of time is corrected using a following equation.

$$\frac{R_K}{R_0} = \frac{V_{20}}{V_{10} - V_{20}}$$

$V_{10}$ and $V_{20}$ may be measured at every detection of a position touched with a finger. But, it is preferable that values just after turning the power on or values measured at every constant interval are memorized and that the values are read out at a touch position detection timing so as to calculate $R_L/R_0$, because the resistance value of the conductive membrane does not change within a short time period. Further, a memorizing method is not limited to a method for memorizing the values of $V_{10}$ and $V_{20}$ themselves, but a method for memorizing a value of:

$$A = \frac{R_k}{R_0} = \frac{V_{20}}{V_{10} - V_{20}}$$

Figure 2:
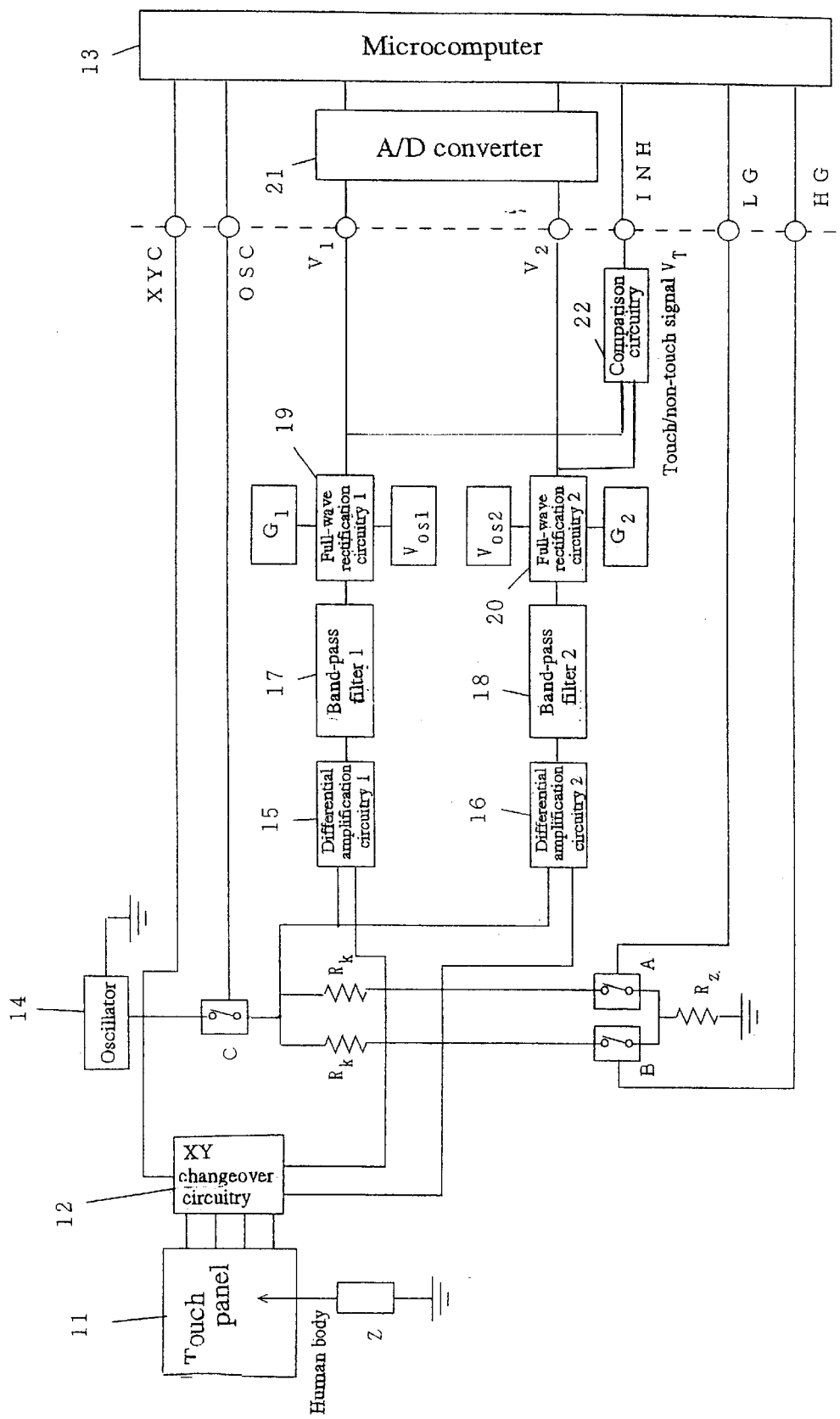
FIG. 2 is a block diagram illustrating an arrangement of a main section of the touch-panel device of the embodiment.
Figure 3:
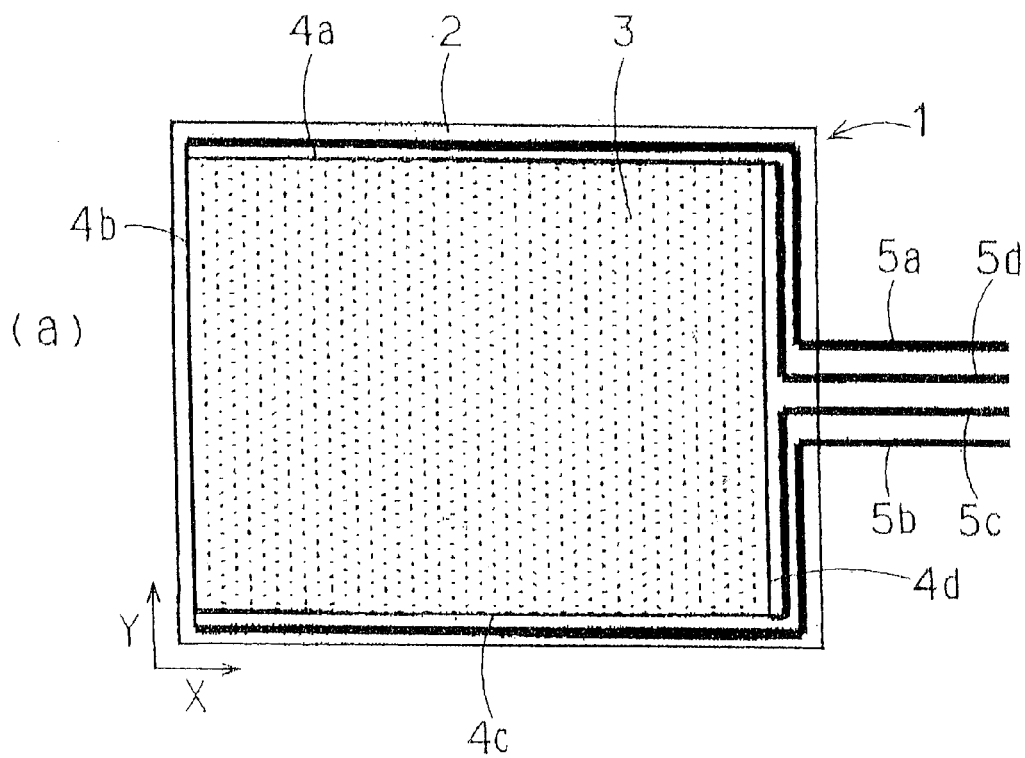
FIG. 3(a) is a diagram illustrating a touch-panel arrangement of the touch-panel device of the embodiment.
FIG. 3(b) is a diagram illustrating an connection arrangement for measuring in X-axis direction.
FIG. 3(c) is a diagram illustrating an connection arrangement for measuring in Y-axis direction.
Figure 3:
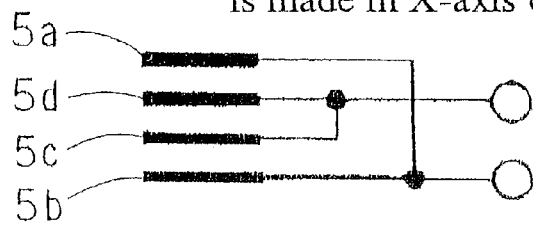
Figure 3:
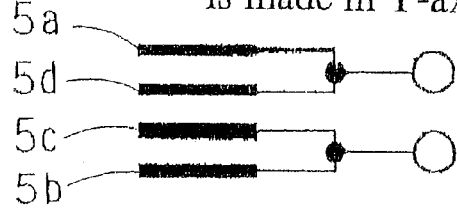

FIG. 2 is a block diagram illustrating an arrangement of a main section of the touch-panel device of an embodiment, while FIG. 3(a) is a diagram illustrating a touch-panel arrangement of the touch-panel device of the embodiment. FIG. 3(b) is a diagram illustrating an connection arrangement for measuring in X-axis direction, FIG. 3(c) is a diagram illustrating an connection arrangement for measuring in Y-axis direction.

The touch-panel 1 is made by forming a conductive membrane 3 on a substrate 2 made of rectangular glass or film, and by forming electrode patterns 4a, 4b, 4c and 4d made of conductive membrane having low resistance such as silver, carbon or the like on outer periphery (4 edges) of the conductive membrane 3. The resistance value of the conductive membrane 3 should be a resistance value for determining variation quantity of $V_1$ and $V_2$ to be a great quantity, because the variation quantity of $V_1$ and $V_2$ becomes a small quantity so that touch position becomes unstable when resistance between the touch-panel and the ground is great which is touched by a user. It is supposed that a user touches the conductive membrane with his finger, but the user may use a touch-pen having a conductive lead wire instead his finger. The lead wire is connected to the ground GND. The connection to GND may be connection to GND on circuitry instead the connection to the ground.

Further, each of 4 outside connection patterns 5a, 5b, 5c and 5s is formed and provided from each of the 4 edges of the electrode patterns. X-axis direction and Y-axis direction are changed over from one another by combination of the 4 outside connection patterns. When measurement of touch position in X-axis direction is carried out, the outside connection patterns 5a and 5b are commonly connected and the outside connection patterns 5c and 5d are commonly connected, as is illustrated in FIG. 3(b). When measurement of touch position in Y-axis direction is carried out, the outside connection patterns 5a and 5d are commonly connected and the outside connection patterns 5b and 5c are commonly connected, as is illustrated in FIG. 3(c). When this changing over in connection is carried out, current flows in a direction which is a direction between the electrode patterns 4a and 4c. Furthermore, insulation and protection coat or protection film may be provided on the conductive membrane of the touch-panel.

The substrate which is the component of the touch-panel is not necessarily to be a transparent substrate. Transparent substrate and opaque substrate are sufficient to be selected depending upon applied apparatus.

The outside connection patterns of the touch-panel are connected to a XY changeover circuitry 12. The XY changeover circuitry 12 changes input in X-axis direction or input in Y-axis direction based upon a changeover signal XYC from a microcomputer 13. Specifically, changeover operation is performed so that the connection illustrated in FIG. 3(b) is realized when input in X-axis direction is needed, while the connection illustrated in FIG. 3(c) is realized when input in Y-axis direction is needed. One end of a resistor $R_k$ is connected to each of two output terminals of the XY changeover circuitry 12. The other ends of the resistors $R_k$ have a common connection point. The common connection point is connected to an oscillator 14, one end of which is connected to the ground via a switch C. ON and OFF of the oscillation output of the oscillator 14 (turning ON and OFF of the switch C) is carried out based upon an ON-OFF signal OSC from the microcomputer 13.

One ends of switches A and B are connected to the connection point of two output terminals of the XY changeover circuitry 12 and the resistors $R_k$, respectively. The other ends of the switches A and B have a common connection point. One end of a resistor $R_z$ is connected to the common connection point, while the other end of the resistor $R_z$ is connected to the ground. The switches A and B are turned ON or turned OFF based upon an ON signal LG or an OFF signal HG from the microcomputer.

The voltages between both ends of the two resistors $R_k$ are input to differential amplifier circuitry 15 and 16, respectively. Output signals from the differential amplifier circuitry 15 and 16 are input to band-pass filters 17 and 18 so as to remove noise components. Thereafter, signals removed noise component therefrom are input to full-wave rectification circuitry 19 and 20. AC voltages are transformed into DC voltages by the full-wave rectification circuitry 19 and 20. The DC voltages are input to an A/D converter 21 and are input to a comparison circuitry 22. Output signals transformed into digital values by the A/D converter 21 are input to the microcomputer as the voltages between both ends of the two resistors $R_k$, then a touch position is calculated by calculation methods which are described later. The comparison circuitry 22 inputs the output signal to the microcomputer 13 as a touch/non-touch signal $V_T$ responding to the input signals from the full-wave rectification circuitry 19 and 20. That is, it is recognized that touch is realized when any one of the signal $V_1$ and $V_2$ is detected to be greater than a predetermined value.

Figure 4:
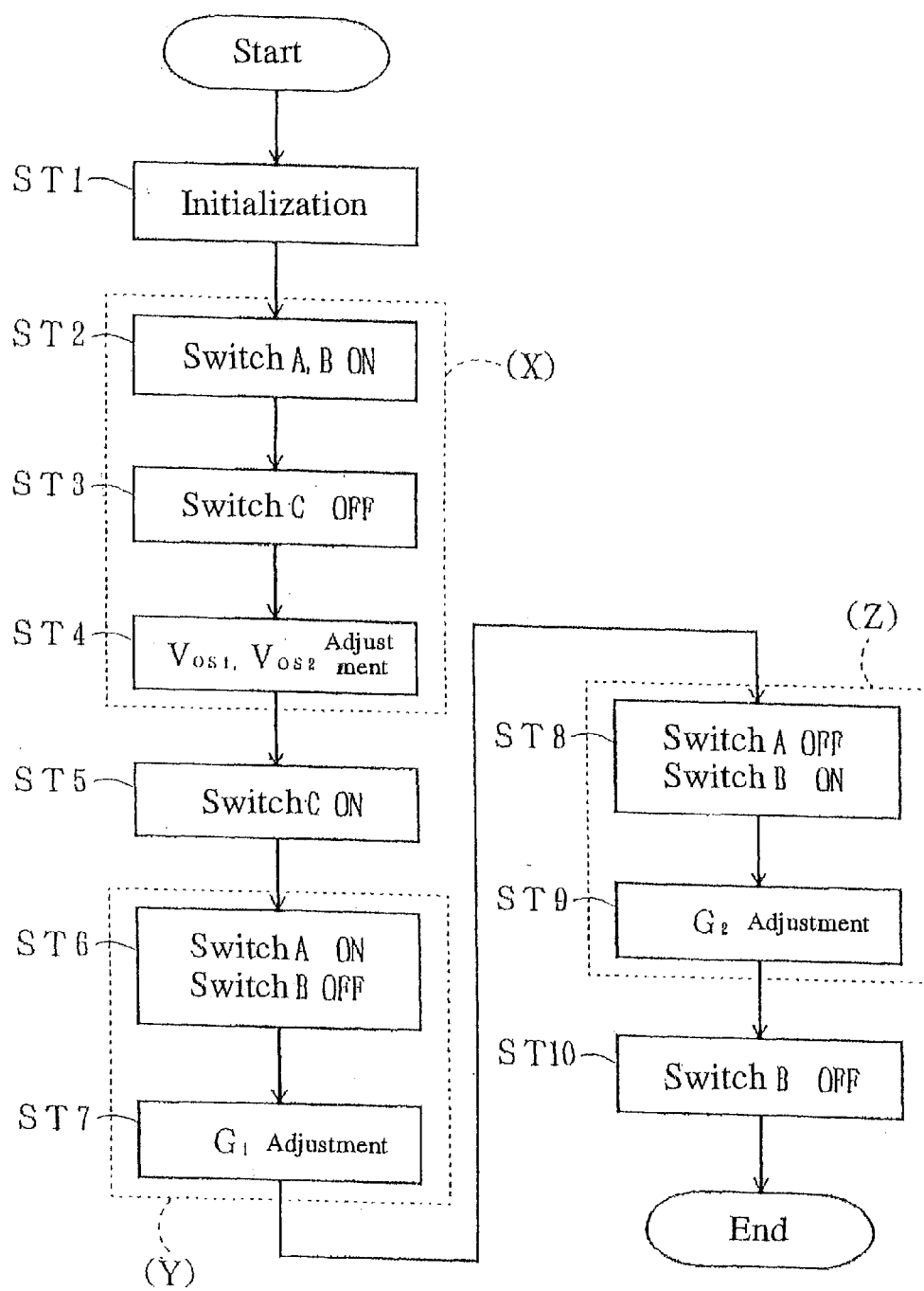
FIG. 4 is a flowchart useful in understanding initial adjustment method for the touch-panel device of the embodiment.

Then, initial adjustment is described using a flowchart in FIG. 4 explaining the initial adjustment method.

Some adjustments should be carried out prior to detection of the touch/non-touch and the detection of the touch position data. The adjustments are sufficient that they are carried out once.

In step ST1, initialization is carried out. The switches A and B are turned ON (in step ST2). The switch C is turned OFF (in step ST3). The offsets of the full-wave rectification circuitry 19 and 20 are adjusted to be 0 (in step ST4). Then, the switch C is turned ON (in step ST5). The switch A is turned ON and the switch B is turned OFF (in step ST6). The amplification rate $G_1$ of the full-wave rectification circuitry 19 is adjusted (in step ST7). The switch A is turned OFF and the switch B is turned ON (in step ST8). The amplification rate $G_2$ of the full-wave rectification circuitry 20 is adjusted (in step ST9). The output signal $V_1$ and $V_2$ of the full-wave rectification circuitry 19 and 20 are determined to be equal to one another by the adjustments. Then, the switch B is turned OFF (in step ST10). Of course, the adjustments in amplification rate may be carried out by adjusting the differential amplifier circuitry 15 and 16, instead.

Figure 5:
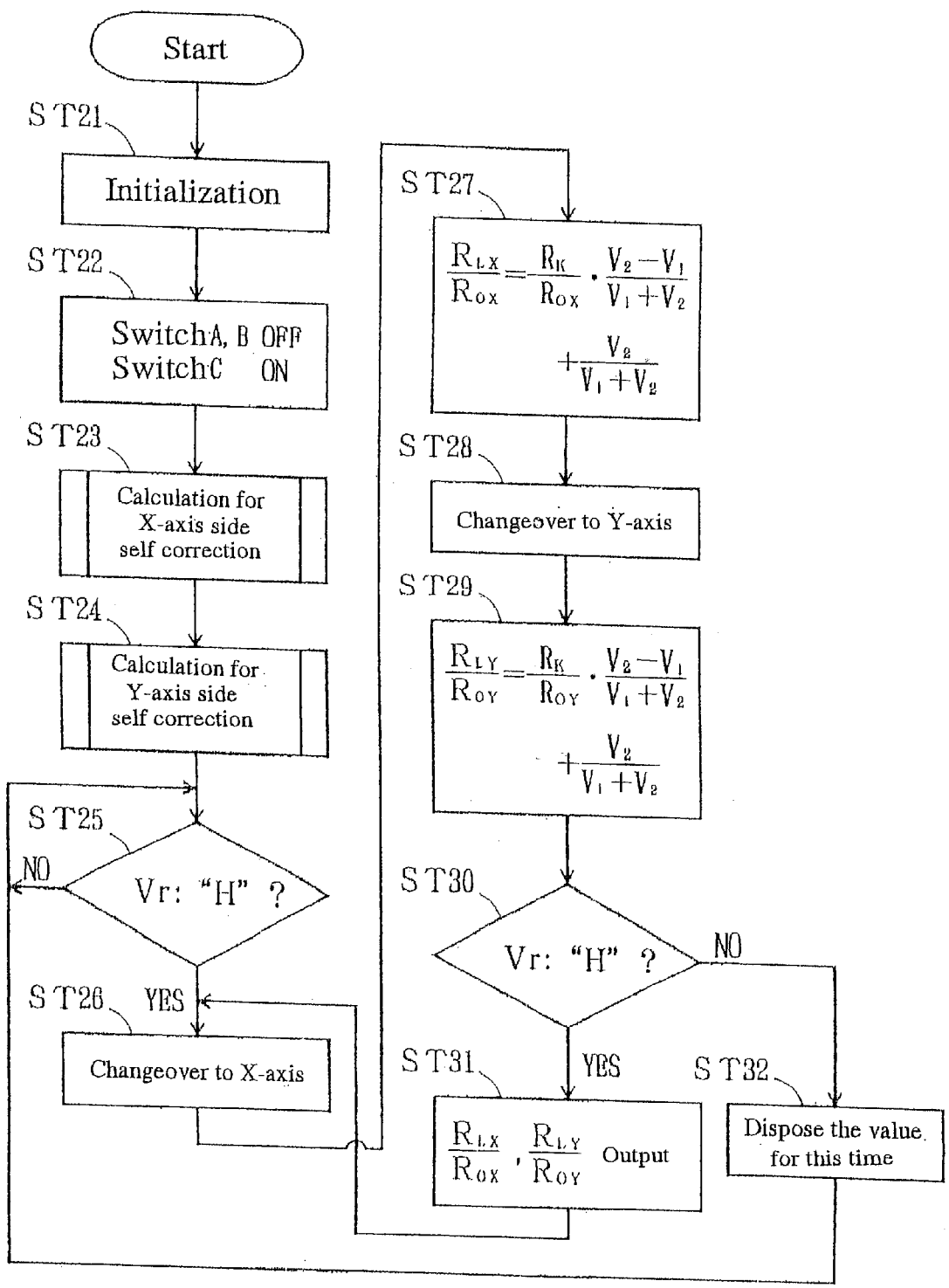
FIG. 5 is a flowchart useful in understanding touch position calculation of the touch-panel device of the embodiment.
Figure 6:
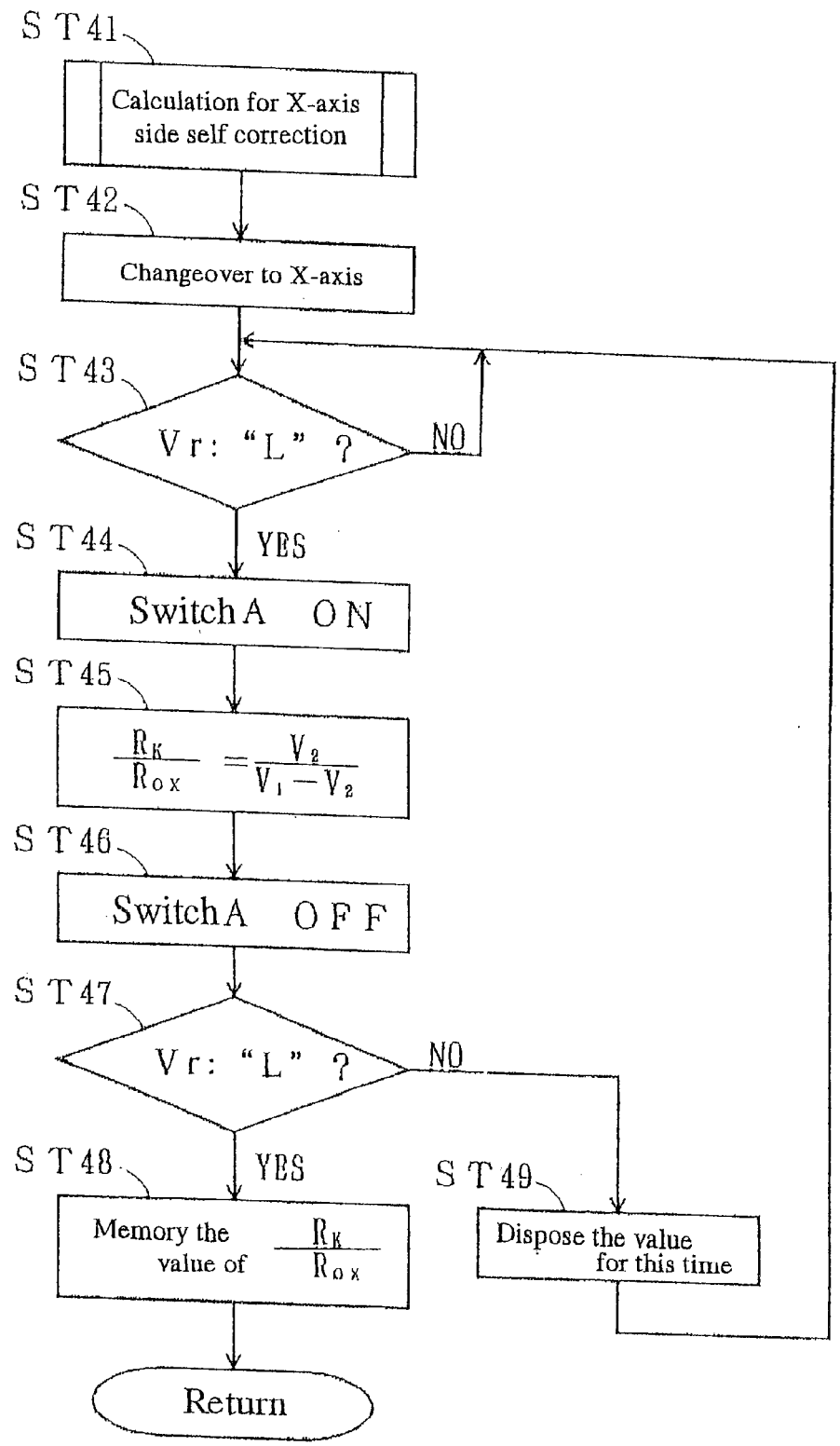
FIG. 6 is a flowchart useful in understanding the calculation method of the X-axis self correction which is used in the touch position calculation illustrated in FIG. 5.
Figure 7:
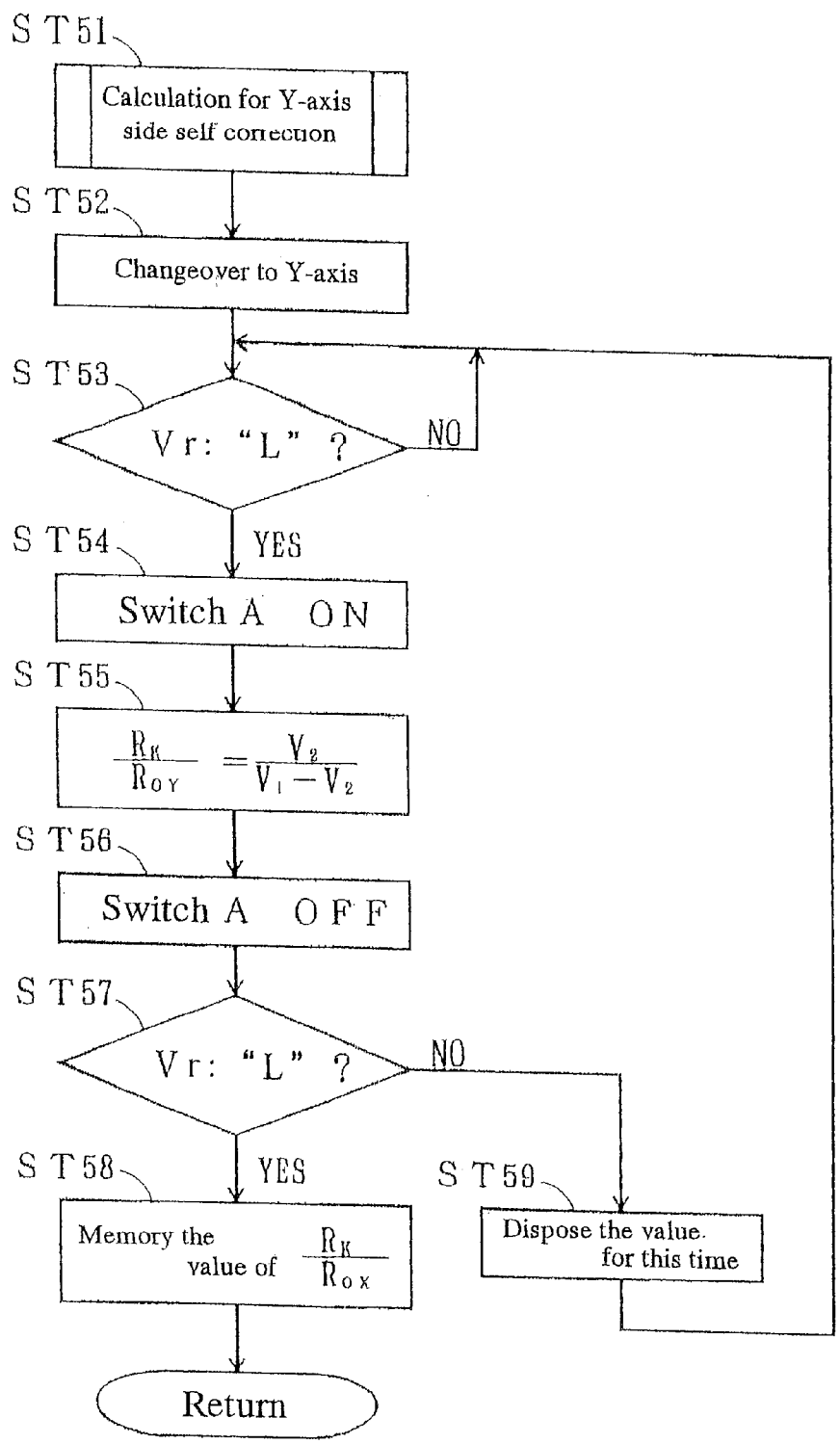
FIG. 7 is a flowchart useful in understanding the calculation method of the Y-axis self correction which is used in the touch position calculation illustrated in FIG. 5.

Then, the calculation of a touch position is described using a flowchart in FIG. 5 explaining the touch position calculation method, a flowchart in FIG. 6 explaining the calculation method of X-axis direction self correction which is used for the touch position calculation, and a flowchart in FIG. 7 explaining the calculation method of Y-axis direction self correction which is used for the touch position calculation.

Initialization is carried out (in step ST21). The switches A and B are turned OFF and the switch C is turned ON (in step ST22). Changeover to the X-axis side is carried out by the XY changeover circuitry 12 and the calculation for the X-axis direction self correction is carried out (in step ST23). Changeover to the Y-axis side is carried out by the XY changeover circuitry 12 and the calculation for the Y-axis direction self correction is carried out (in step ST24). The calculation operations are carried out within the microcomputer 13.

The calculation for the X-axis direction self correction is carried out as follows:

Input from the touch-panel is changed over to the X-axis side (in step ST42). The switch A is turned ON (in step ST44) when the touch/non-touch signal $V_T$ does not exist ($V_T$: "L"). $R_K/R_{OX}=V_2/(V_1-V_2)$ is calculated from $V_1$ and $V_2$ at this timing (in step ST45). Then, the switch A is turned OFF (in step ST46). The value of $R_K/R_{OX}$ is memorized by the microcomputer 13 (in steps ST47 and ST48) when the touch/non-touch signal $V_T$ does not exist. When the touch/non-touch signal $V_T$ exists ($V_T$: "H"), the correction calculation is not carried out correctly. Therefore, the calculation values are disposed (in steps ST47 and ST49). Then, the processing is returned to the recognition of the touch/non-touch signal $V_T$ in step ST43, the calculation is carried out again. In this processing, the inputs of $V_1$ and $V_2$ to the comparison circuitry 22 are used as the touch/non-touch signal $V_T$, and the touch condition is recognized and the processing is moved to the touch detection processing when the touch/non-touch signal $V_T$ is greater than a threshold value. But, it is possible instead that a differential circuitry is employed and that the touch/non-touch signal is judged based upon the variation value obtained by differential operation.

The calculation for the Y-axis direction self correction is carried out in steps ST51~ST59 simultaneously to the calculation for the X-axis direction self correction, so as to memorize the value of $R_K/R_{OY}$ in the microcomputer.

When an operator touches the touch panel and when the touch/non-touch signal $V_T$ becomes "H" (in step ST25), the input from the touch panel is changed over to the X-axis side (in step ST26). $R_{LX}/R_{OX}$ is calculated based upon the inputs $V_1$ and $V_2$ at this timing and $R_K/R_{OX}$ in X-axis side which has already memorized (in step ST27). Then, the input from the touch panel is changed over to the Y-axis side (in step ST28). $R_{LY}/R_{OY}$ is calculated based upon the inputs $V_1$ and $V_2$ at this timing and $R_K/R_{OY}$ in Y-axis side which has already memorized (in step ST29). Continuously, the touch/non-touch signal $V_T$ is observed (in step ST30). The calculation values of $R_{LX}/R_{OX}$ and $R_{LY}/R_{OY}$ for this time are output as the touch position (in step ST31) when the touch/non-touch signal $V_T$ is "H". On the contrary, when the touch/non-touch signal $V_T$ is "L", the touch position calculation is not carried out correctly. Therefore, the calculation values of $R_{LX}/R_{OX}$ and $R_{LY}/R_{OY}$ for this time are disposed (in step ST32). Then, the processing is returned to step ST25 so as to become a waiting condition (waits until the touch/non-touch signal $V_T$ becomes "H").

Figure 8:
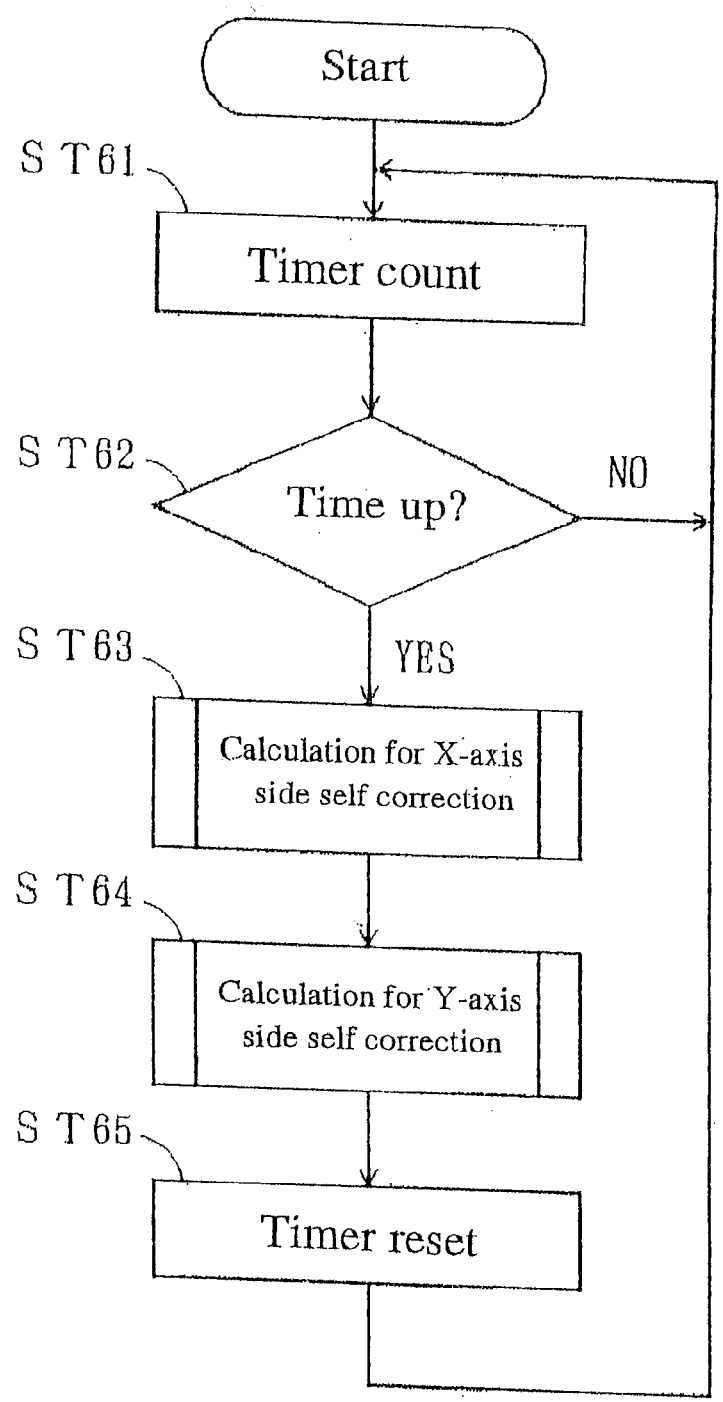
FIG. 8 is a flowchart useful in understanding a timer interruption in the flowchart illustrated in FIG. 6.

During this waiting condition, a constant time is counted as is illustrated in FIG. 8 (in steps ST61 and ST62). The X-axis direction self correction (in step ST63) and the Y-axis direction self correction (in step ST64) are carried out at every constant time so as to renew the values of $R_K/R_{OX}$ and $R_K/R_{OY}$. Therefore, the touch position is accurately calculated based upon the renewed values of so as to realize accurate detection even when the resistance value of the conductive membrane on the touch panel varies or even when the resistance value changes following passage in time. Further, the touch panel becomes cheap.

Figure 9:
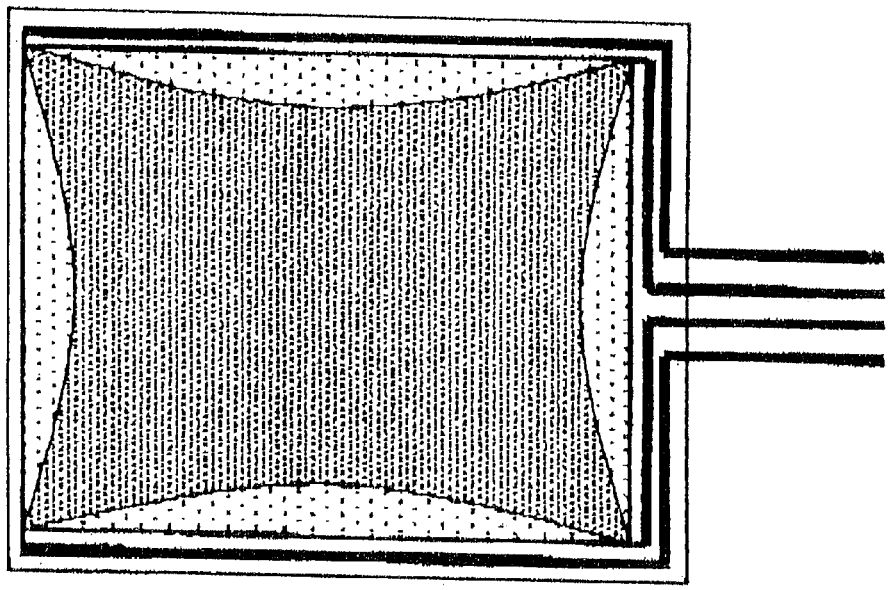
FIG. 9 is a diagram illustrating an extent of a value of $R_L/R_0$ when it is calculated using $V_1$ and $V_2$ of the touch-panel device of the embodiment.
Figure 9:
Figure 11:
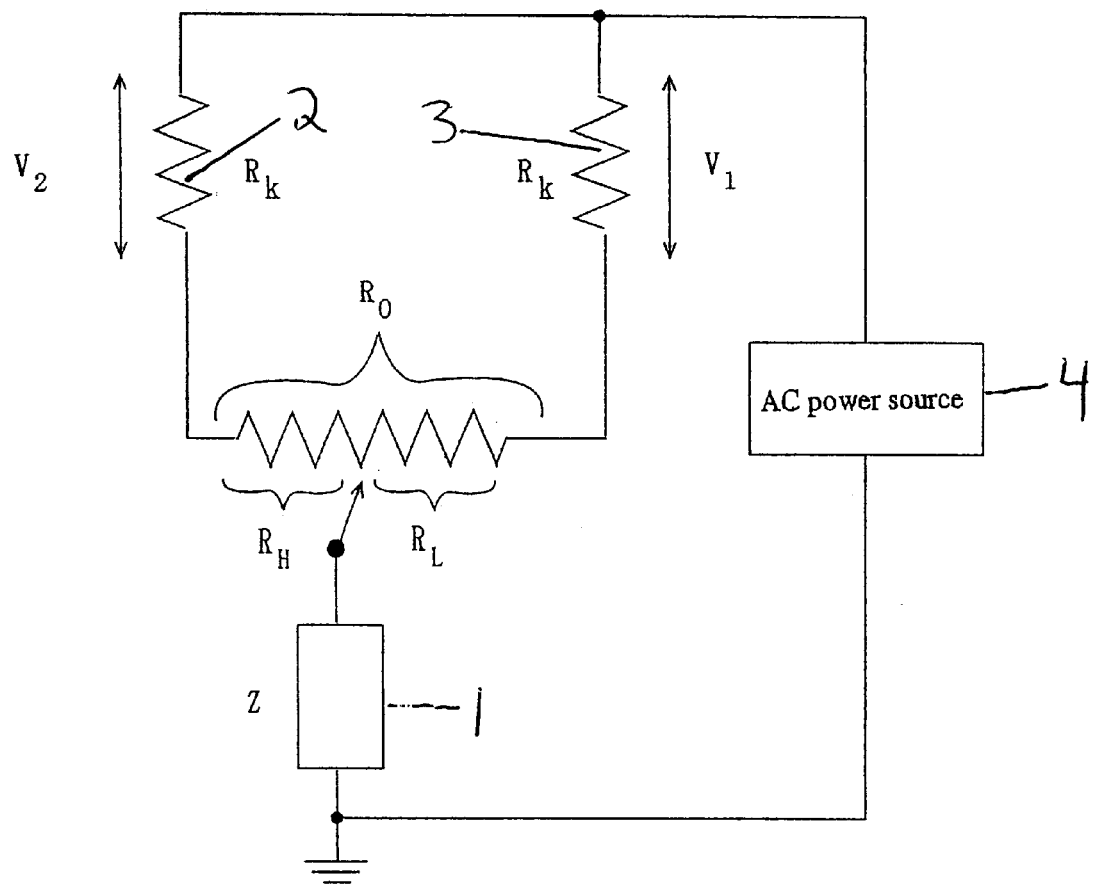
FIG. 11 is a schematic diagram useful in understanding touch position detection principal of a conventional touch-panel device.

In the actual touch panel, the electrode patterns made of conductive membrane having a low resistance have resistances. Therefore, in both edges in X-axis or Y-axis, the value of $R_L/R_O$ become 0 or 1 at corner sections, while the value of $R_L/R_O$ become a value which is different from 0 or 1 at positions apart from the corner sections, as is illustrated in FIG. 9. Consequently, the value of $R_L/R_O$ should be corrected for detecting the touch position accurately. The curvature phenomenon in edge sections of the touch panel can be made to be linear to some degree by adjusting the resistance value of the conductive membrane of the touch section of the touch panel and the resistance value of the electrodes which are in the edge sections of the touch panel. The conductive membrane of the touch section is preferable to have the resistance value of several hundreds $\Omega/\square$~several $k\Omega/\square$. The electrodes is preferable to have the resistance value of several $\Omega$~several $k\Omega$ which must be lower values than the resistance value of the transparent conductive membrane.

A correction table for touch position detection coordinates (x, y) of the touch-panel device of an embodiment is illustrated in FIG. 10.

$X_0, X_1, X_2, \ldots, X_n, Y_0, Y_1, Y_2, \ldots, Y_n$ in the correction table are values of $R_{LX}/R_{OX}$ and $R_{LY}/R_{OY}$ and corresponding to X-axis and Y-axis which are obtained by the above calculations for the touch position. The table is formed by actually measuring position coordinates on the actual touch panel corresponding to the values of $R_{LX}/R_{OX}$ and $R_{LY}/R_{OY}$ using a standard touch panel. The information of this correction table is memorized within the touch-panel device. When an operator touches the touch panel and when $X=R_{LX}/R_{OX}$ and $Y=R_{LY}/R_{OY}$ are obtained by the above calculation methods for the touch position, the touch coordinates (x, y) corresponding to X and Y are read out and are output as the touch position coordinates.

When resolution of the touch position coordinates become great due to increase in area of the touch panel and when memory capacity within the touch panel is needed to be great, accordingly, division intervals of X and Y within the correction table are determined to be great so as to decrease the memory capacity. For X and Y which do not exist in the correction table (X is between $X_{n-1}$ and $X_n$, while Y is between $Y_{n-1}$ and $Y_n$), the values may be calculated using an interpolation method or the like.

It is possible that approximate expressions are obtained from the actually measured coordinates on the standard touch panel and the values of $X=R_{LX}/R_{OX}$ and $Y=R_{LY}/R_{OY}$ obtained by the above calculation methods for the touch position and that the calculation operations are carried out by the microcomputer or the like using the approximate expressions so as to output the calculation results as the touch position coordinates.

In the above embodiment, description was made for two directions of X-axis and Y-axis. It is also applicable that similar processing can be carried out for a touch panel which has a polygon shape or a shape surrounded with a curved line so as to have multiple axes directions.

Hereinafter, we explain resistance values of the electrode patterns in detail.

The resistance values of the electrode patterns are obtained from relational equations (4-1) and (4-2) which have relationship with the resistance value of the conductive membrane:

$$C_A = (X^* R_A)/(8^* \rho) \quad (4\text{-}1)$$

$$C_B = (X^* R_B)/(8^* \rho) \quad (4\text{-}2)$$

Figure 12:
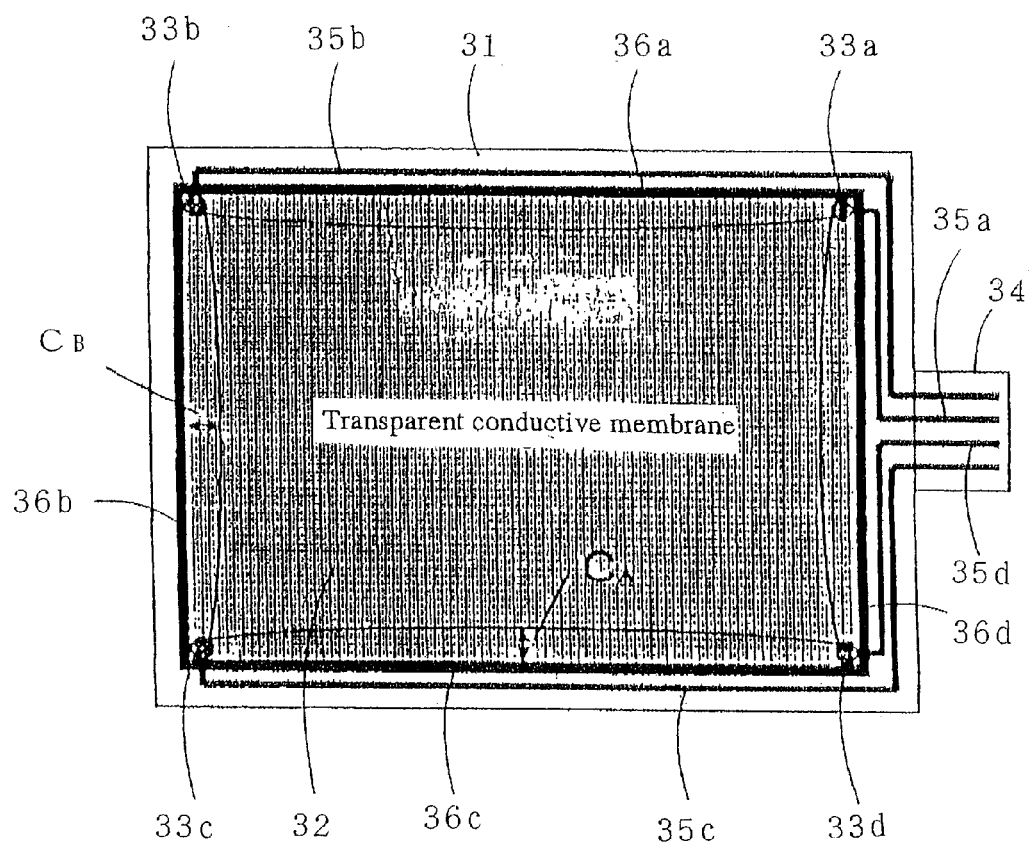
FIG. 12 is a diagram useful in understanding panel electrode arrangement of a touch-panel device of another embodiment.

Wherein, $C_A$ [mm]: maximum curvature of linearity in periphery of the electrode in X-axis direction on edge of the touch panel (illustrated in FIG. 12), $C_B$ [mm]: maximum curvature of linearity in periphery of the electrode in Y-axis direction on edge of the touch panel (illustrated in FIG. 12), $R_A$ [Ω]: sum of resistance value between electrodes of 1 electrode in X-axis direction, $R_B$ [Ω]: sum of resistance value between electrodes of 1 electrode in Y-axis direction, X [mm]: length of an edge in X-axis direction, Y [mm]: length of an edge in Y-axis direction, $\rho$[Ω/□]: resistance value of the conductive membrane on the surface of the substrate.

Figures 13, 14:
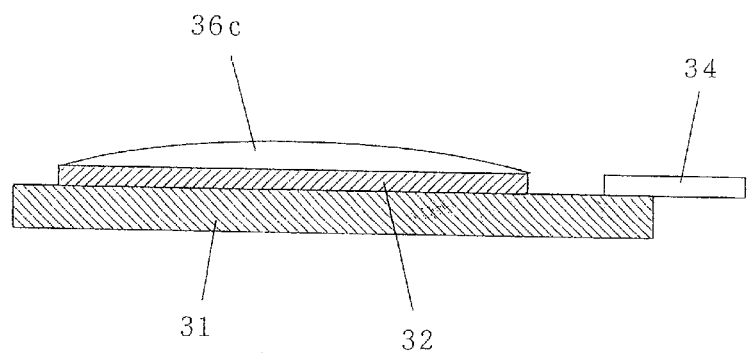
FIG. 13 is a table of an example of resistance values of the panel electrodes of the touch-panel device of the embodiment.
FIG. 14 is a cross sectional view of a touch-panel device of a further embodiment.

Examples of the resistance values of the electrode pattern is illustrated in FIG. 13.

When the touch-panel device is designed, values of $C_A$ and $C_B$ are calculated from the equations (4-1) and (4-2), then the resistance values of the electrode patterns are obtained. It is preferable that the resistance values of the electrode patterns are as low as possible. But, when the resistance values are determined to be 0Ω, AC currents supplied to the touch-panel device flow only through the electrode patterns and do not flow through the conductive membrane of the touch-panel device. The measurement accuracy of the current values are lowered, accordingly, so that the position detection with high accuracy is not realized. In general, the values of $R_A$ and $R_B$ are preferable to be equal or more than several hundreds Ω. By the above determination, positional shifting in linearity in peripheral area of the conductive membrane is reduced. When the specific resistance $\rho$ of the conductive membrane 32 and the sum $R_A$ of resistance of the electrode 16a are changed and when the maximum value $C_A$ of curvature is calculated, results illustrated in FIG. 13 are obtained. Wherein, $C_A$=8.5 is the smallest value. Therefore, the touch-panel device having the smallest $C_A$ is realized when $\rho$ and $R_A$ corresponding to the smallest $C_A$.

But, even when the values of $R_A$ and $R_B$ are determined to be several hundreds Ω, the values of $C_A$ and $C_B$ never become 0 mm. Therefore, linearity in neighboring area with respect to the electrodes becomes a slight curve. A touch-panel device of another embodiment according to the present invention is described for dissolving the problem.

FIG. 14 is a diagram illustrating electrode arrangement of the touch-panel device of the embodiment.

The touch-panel device comprises a substrate 31 made of a rectangular glass or film or the like, a conductive membrane 32 formed on the substrate 31, and conductive bodies 36a, 36b, 36c and 36d formed on the conductive membrane 32 in its outer peripheral section. Each conductive body is formed to have a thickness which is determined to increase from edges to the central section in a second order curve shape. Further, electrode sections 34 made of low resistance conductive material such as silver, carbon or the like are formed on outer peripheral sections of the conductive membrane, that is on the four edges of the membrane, in a second order curve shape.

Other arrangements are similar to those of the above embodiment, therefore detailed description is omitted.

The thickness of the conductive bodies are calculated based upon the resistance values calculated by equations (5-1) and (5-2).

When this embodiment is employed, linearity in outer peripheral sections of the conductive membrane is improved. In addition, the width of the conductive bodies are determined to be small, therefore the touch-panel device is decreased in size.

Further, linearity in outer peripheral sections of the conductive membrane is also improved by changing the width of the electrodes which are disposed in a linear shape and by varying resistance value from edges to the central section, accordingly.

Figure 15:
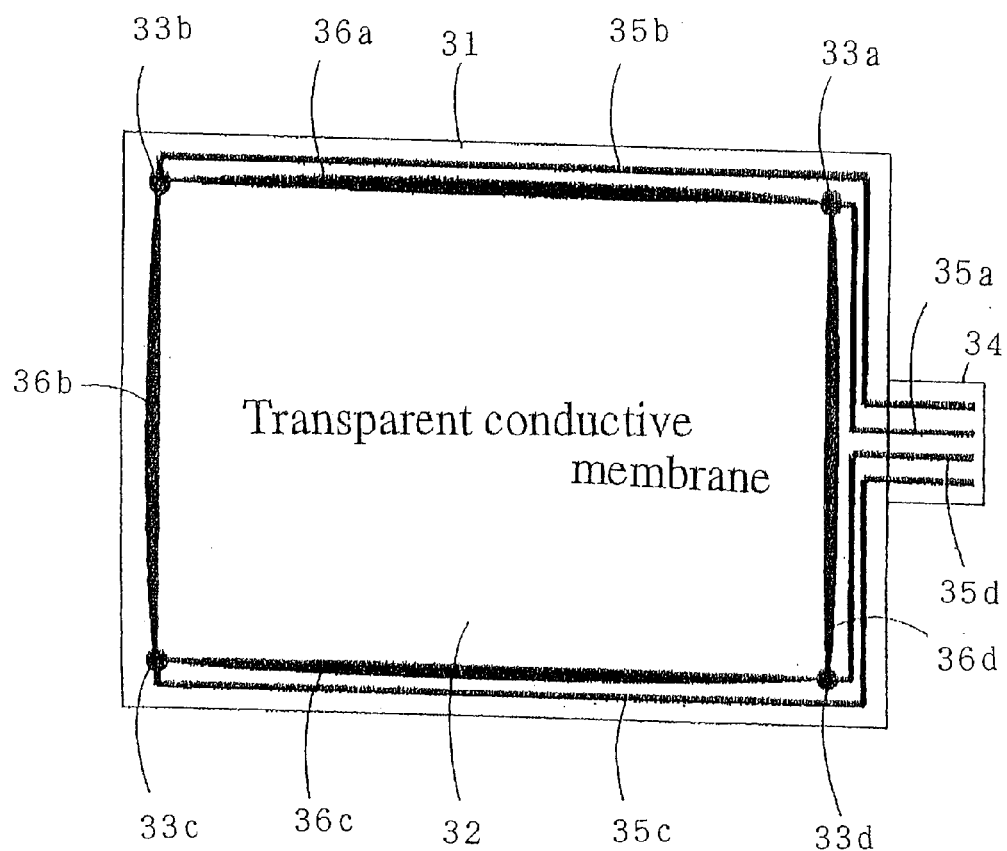
FIG. 15 is a plan view illustrating panel electrode arrangement of a touch-panel device of a yet embodiment.

FIG. 15 is a diagram illustrating an arrangement of an electrode of a touch-panel device of a further embodiment.

This embodiment determines the width of the electrodes 36a, 36b, 36c and 36d to be a width which increases from edges to the central section in a second order curve shape. The electrodes 36a, 36b, 36c and 36d are formed on outer peripheral sections of the transparent conductive membrane 32.

Equations (5-1) and (5-2) for calculating resistance values of the electrodes 36a, 36b, 36c and 36d at each positions in X-axis direction and in Y-axis direction in FIG. 15 are as follows:

$$R(x) = (R_A/2)(4^* x^2/X^2) \quad (5\text{-}1)$$

$$R(y) = (R_B/2)(4^* y^2/Y^2) \quad (5\text{-}2)$$

Wherein,

R(x) [Ω]: resistance value of an electrode at a point in X-axis direction from the central section, R(y) [Ω]: resistance value of an electrode at a point in Y-axis direction from the central section, $R_A$ [Ω]: a sum of resistance values between electrodes of one electrode in X-axis direction, $R_B$ [Ω]: a sum of resistance values between electrodes of one electrode in Y-axis direction, X [mm]: length of an edge in X-axis direction, Y [mm]: length of an edge in Y-axis direction, X [mm]: distance between a point in X-axis direction and the central section, Y [mm]: distance between a point in Y-axis direction and the central section.

The equation (5-1) is obtained by the followings. Also, the equation (5-2) is obtained similarly to the equation (5-1).

$$\Delta R(x) = R_a \frac{\Delta x}{X} \quad R_a: \text{resistance value of an interval}$$

$$R(x) = \int_0^x \frac{R_a}{X} \times dx \, R_A: \text{total resistance value of an electrode}$$

$$R(x) = \frac{R_a}{2X} x^2 \quad (6)$$

substitute $$x = \frac{X}{2}$$

$$R\left(\frac{X}{2}\right) = \frac{R_a}{2X} \frac{X^2}{4} = \frac{R_a X}{8}$$

substitute the condition of $$\left(\frac{X}{2}\right) = \frac{R_\Lambda}{2}$$

and deform the equation $$R_a = \frac{4R_\Lambda}{X}$$

substitute the equation for the equation (6)

$$R(x) = \frac{R_\Lambda}{2} \frac{4x^2}{X^2}$$

Figure 16:
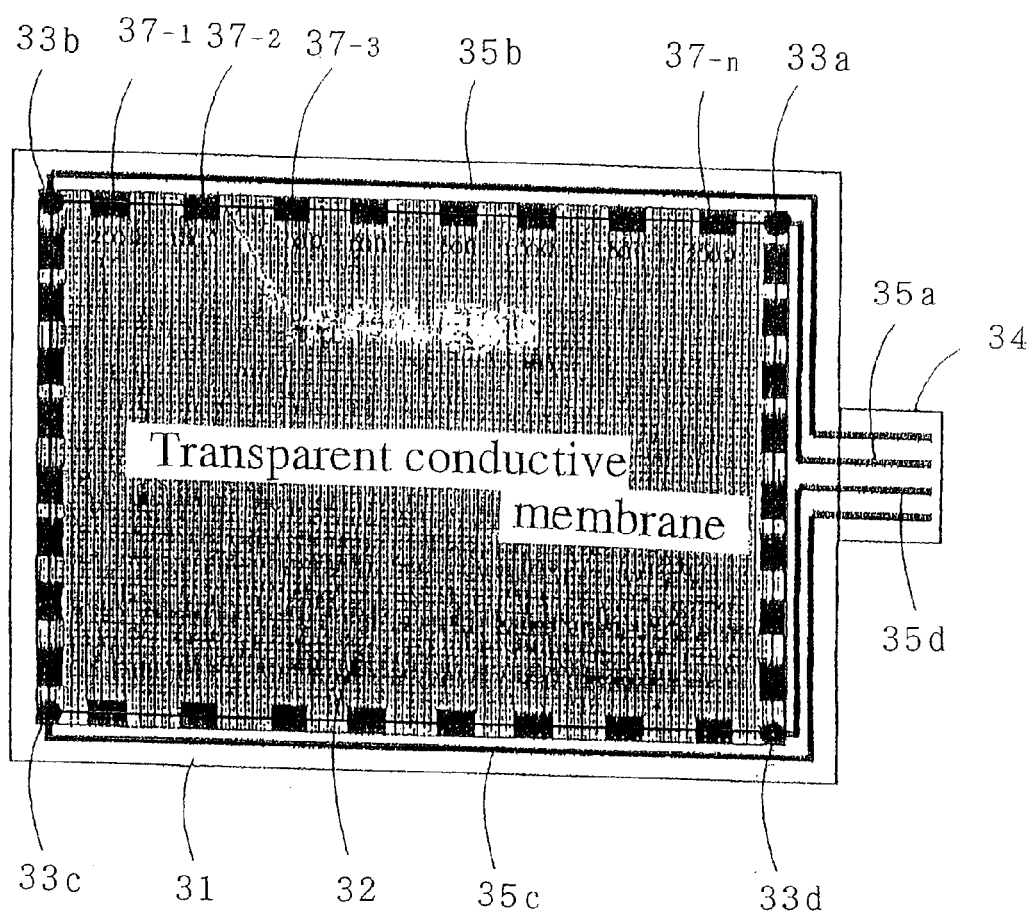
FIG. 16 is a plan view illustrating panel electrode arrangement of a touch-panel device of yet another embodiment.

FIG. 16 is a diagram illustrating a touch-panel device of a further embodiment. In this embodiment, multiple electrodes made of low resistance material which is lower its resistance than the resistance of the conductive membrane on the substrate, are disposed, and the multiple electrodes are disposed in a manner that resistance values are changed in a second order curve shape from edges to the central section. Therefore, linearity in peripheral sections of the conductive membrane is improved to be a straight line shape. Low resistance electrodes $37_{-1}, 37_{-2}, \ldots, 37_{-n}$ provided between the terminal 33a and the terminal 33b correspond to the multiple electrodes.

Specifically, land sections for connecting conductive bodies which construct electrodes, are provided on peripheral sections of the conductive membrane, then conductive bodies are provided to corresponding land, each conductive body having corresponding resistance value. Consequently, electrodes are constructed in one edge. Equations for calculating resistance values of electrodes at each position are obtained from the equations (5-1) and (5-2).

When one of embodiments (corresponding to FIGS. 12~16) is employed, shifting in touch position (shifting between actual touch position and detected touch position) due to the resistance of the conductive membrane is reduced.

What is claimed is:

1. A touch-panel device comprising:
    a touch-panel including a substrate and a conductive membrane provided on the substrate;
    an AC current generation section for supplying AC currents to the conductive membrane through a first point and a second point which are at outer peripheral sections of the conductive membrane; and
    current measurement sections for measuring a first current supplied through the first point and a second current supplied through the second point;
    wherein the touch panel has an impedance which is connected by interposing a switch between one end of the AC current generation section and a connection point, and
    wherein a touch position on the touch-panel is calculated based upon a current measurement value measured by the current measurement sections when the position measurement is not carried out and when the switch is turned ON and another current measurement value measured by the current measurement sections when the switch is turned OFF.

2. A touch-panel device as set forth in claim 1, wherein the switch is turned ON and turned OFF at constant intervals, a current measurement value measured by the current measurement section when the switch is turned ON is memorized, and a touch position on the touch-panel is calculated based upon the memorized current measurement value and a current measurement value measured by the current measurement section when the switch is turned OFF.

3. A touch panel device comprising:
    a touch-panel including a substrate, a conductive membrane provided on the substrate, and electrodes made of low resistance conductive material, the resistance of the electrodes being lower than the resistance of the conductive membrane, said electrodes being provided at peripheral sections of the conductive membrane;
    an AC current generation section for supplying AC currents to the conductive membrane through a first point and a second point which are at outer peripheral sections of the conductive membrane; and
    current measurement sections for measuring a first current supplied through the first point and a second current supplied though the second point,
    wherein a touched position is calculated based upon the measured first current and the measured second current; and
    the resistance value of the electrodes is determined to be an optimum value using a calculation formula of:

$$C_A = (X^* R_A)/(8^* \rho) \text{ and}$$

$$C_B = (Y^* R_B)/(8^* \rho)$$

wherein, $C_A$ [mm] is a maximum curvature of linearity in a periphery of an electrode section in X-axis direction, $C_B$ [mm] is a maximum curvature of linearity in a periphery of electrode section in the Y-axis direction, $R_A$ [Ω] is a total resistance value of an electrode in the X-axis direction, $R_B$ [Ω] is a total resistance value of an electrode in the Y-axis direction, X [mm] is a length of the electrode in X-axis direction, Y [mm] is a length of the electrode in Y-axis direction, and $\rho[\Omega/\square]$ is a resistance value of the conductive membrane on the surface of the substrate.

* * * * *